United States Patent [19]

Willis

[11] 4,112,465
[45] Sep. 5, 1978

[54] THRUSH CURRENT START-UP CIRCUIT FOR A TELEVISION RECEIVER INCLUDING A START-UP DECOUPLING CIRCUIT

[75] Inventor: Donald Henry Willis, Indianapolis, Ind.

[73] Assignee: RCA Corporation, New York, N.Y.

[21] Appl. No.: 826,693

[22] Filed: Aug. 22, 1977

[51] Int. Cl.² ............................................. H04N 3/18
[52] U.S. Cl. ..................................... 358/190; 315/411
[58] Field of Search ......................... 358/190; 315/411

[56] References Cited

U.S. PATENT DOCUMENTS

| 3,891,892 | 6/1975 | Bohringer | 315/411 |
| 3,908,159 | 9/1975 | Griffey | 358/190 |
| 3,947,632 | 3/1976 | Giger et al. | 358/190 |

Primary Examiner—John C. Martin

Attorney, Agent, or Firm—Eugene M. Whitacre; Paul J. Rasmussen; Joseph Laks

[57] ABSTRACT

A start-up circuit for a television receiver includes a circuit for rectifying the AC line voltage and a filter for providing a smoothed DC voltage. When the receiver is turned on, an initial interval exists in which an inrush current flows into the filter. A winding, magnetically coupled to an inductor in the path of the inrush current, develops an alternating current potential during the initial interval. This potential is rectified and provides a start-up operating voltage for the television receiver load circuits. During the steady state interval, a second circuit provides the operating voltage, and a third circuit couples to the winding a voltage which varies in value from the initial interval to the steady state interval in a manner which decouples the alternating current potential from the load circuits during the entirety of the steady state interval.

10 Claims, 3 Drawing Figures

THRUSH CURRENT START-UP CIRCUIT FOR A TELEVISION RECEIVER INCLUDING A START-UP DECOUPLING CIRCUIT

BACKGROUND OF THE INVENTION

This invention relates to start-up power supplies for television receivers.

Rectified AC line voltage is filtered and regulated to provide a high B+ operating voltage to the television receiver. The high B+ may be coupled, for example, to the horizontal deflection circuit for generating scanning current in the horizontal deflection winding. Low B+ voltages must also be provided as operating voltages to various receiver circuits, such as the oscillator and driver stages of the horizontal deflection circuit itself.

Often it is desirable to derive the low B+ voltages from a secondary winding of the horizontal output transformer after the horizontal deflection circuit has begun to function. However, during the initial start-up interval after the receiver is turned on, no low B+ voltages are generated by the horizontal output transformer to operate the oscillator and driver stages of the horizontal deflection circuit. Another source of low B+ voltage must be provided during this initial start-up interval.

A method of providing a low B+ start-up voltage is disclosed in U.S. patent application Ser. No. 750,632, filed Dec. 15, 1976, entitled, INRUSH CURRENT START-UP CIRCUIT FOR A TELEVISION RECEIVER, by R. E. Fernsler et al. AC line voltage is rectified and coupled to a smoothing filter for providing a high B+ voltage. When the receiver is turned on, an initial interval exists in which inrush current flows into the uncharged filter capacitor. A start-up circuit includes a winding coupled magnetically to an inductor in the path of the inrush current. The winding develops an alternating current potential during this initial interval, which is rectified to provide a low B+ start-up operating voltage for television receiver circuits, such as the horizontal deflection circuits.

After the initial interval has elapsed during the steady state interval, the horizontal deflection circuit itself will provide the low B+ operating voltage. The rectifiers in the start-up circuit should become reverse-biased by the steady state positive low B+ operating voltage, decoupling the alternating current potential appearing across the aforementioned winding from the television receiver circuits during the steady state interval.

For certain television receivers, a relatively large start-up power is needed by the horizontal deflection circuits. Under these circumstances, the alternating current potential may be of sufficient magnitude to forward-bias the start-up circuit rectifiers during peak excursions of the alternating current potential even during the steady state interval. This potential, when coupled to the horizontal deflection circuit, will produce unwanted modulation of the raster. It is desirable, therefore, when designing a start-up circuit which is required to deliver relatively large start-up power, to ensure that the alternating current potential be decoupled from the television receiver circuits for the entirety of the steady state interval.

SUMMARY OF THE INVENTION

A start-up power supply includes a first rectifier responsive to a source of first alternating current voltage for providing a pulsating direct current voltage and includes a filter coupled to the first rectifier for providing a first direct current voltage. An inrush current flows in the filter and in an inductor, during an initial interval. A first circuit is coupled to the inductor and is responsive to the inrush current for developing a second alternating current potential during the initial interval. A second rectifier is coupled to the first circuit and is responsive to the second alternating current potential for coupling a first operating voltage to a load circuit during the initial interval. A second circuit is coupled to the load circuit for providing a second operating voltage during a steady state interval. A third circuit couples a third voltage to the second rectifier, with the third voltage varying in value from the initial interval to the steady state interval in a manner providing for decoupling of the second alternating current potential from the load circuit during the entirety of the steady state interval.

DESCRIPTION OF THE INVENTION

Figure 1:
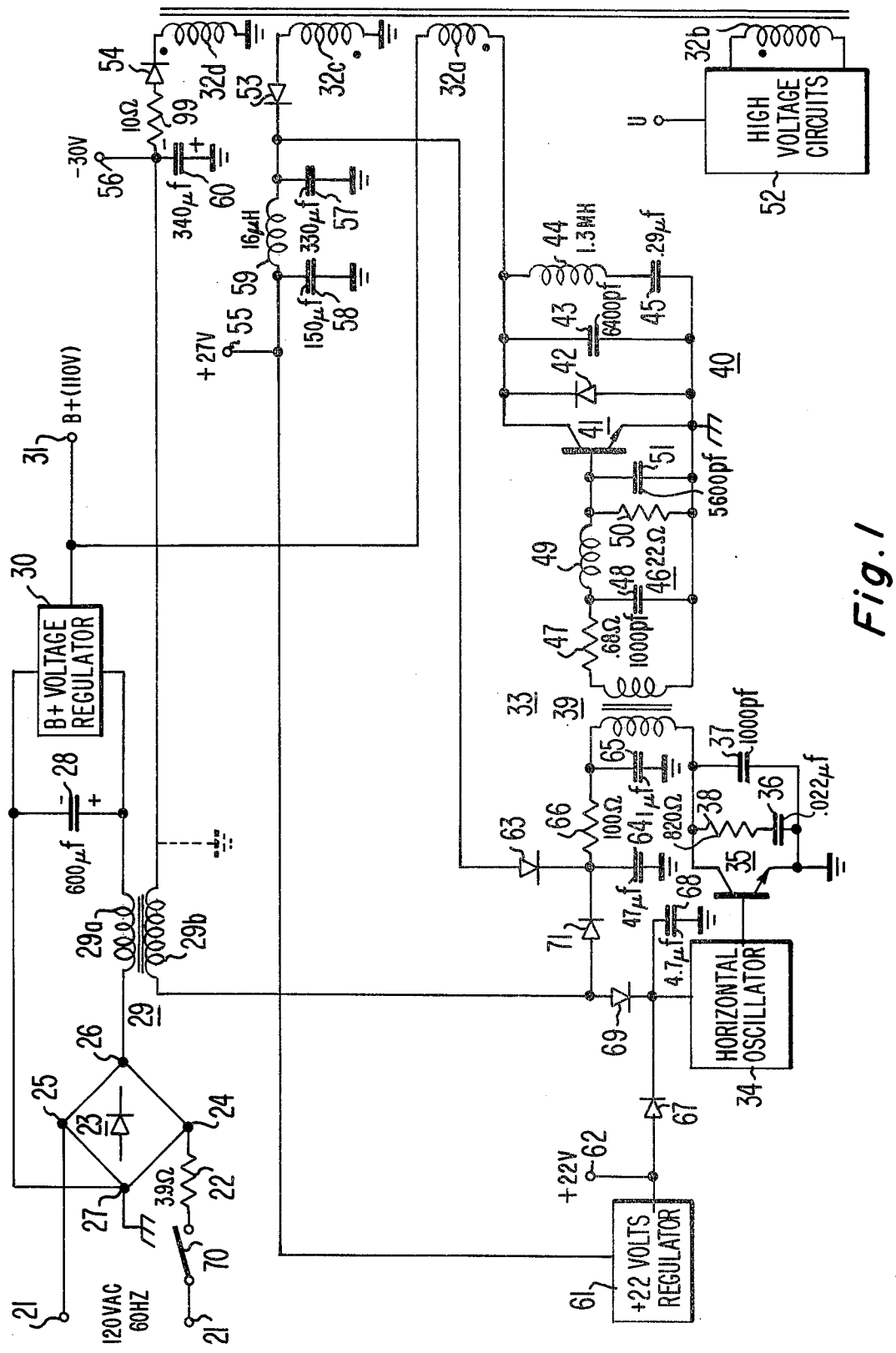
FIG. 1 illustrates a television receiver circuit including a start-up circuit according to the invention.

In FIG. 1, 120 volt 60 Hz AC line voltage, obtained at terminals 21, is coupled through an ON/OFF switch 70 and a current limiting resistor 22 to input terminals 24 and 25 of a bridge rectifier 23. An output terminal 26 of bridge rectifier 23 is coupled to one end of a main filter capacitor 28 through an inductor 29a. Inductor 29a comprises a primary winding of a transformer 29. The other end of capacitor 28 is coupled to a return terminal 27 of rectifier 23, the return terminal being designated a ground reference potential that is not isolated from the AC line.

The filtered direct current voltage across capacitor 28 is coupled to a B+ voltage regulator 30, which may be of conventional design, to provide a regulated high B+ operating voltage at a terminal 31, the high B+ operating voltage illustratively shown as +110 volts.

The high B+ operating voltage is coupled to a primary winding 32a of a horizontal output transformer 32 of a horizontal deflection circuit 33 of a television receiver. Horizontal deflection circuit 33 comprises a horizontal oscillator 34, a horizontal driver transistor 35 with filter elements 36–38, a coupling transformer 39, a horizontal output circuit 40, and horizontal output transformer 32.

Horizontal output circuit 40 comprises a horizontal output transistor 41, a damper diode 42, a retrace capacitor 43 and a series coupled horizontal deflection winding 44, and an "S" shaping capacitor 45. A secondary winding of coupling transformer 39 is coupled across the base-emitter of horizontal output transistor 41 through a filtering and waveshaping network 46 comprising elements 47–51.

A tertiary winding 32b of horizontal output transformer 32 is coupled to a high voltage circuit 52 for providing a high voltage accelerating potential at a terminal U to the ultor of a cathode ray tube, not shown.

After horizontal deflection circuit 33 begins to operate, horizontal trace and retrace voltages, appearing across a secondary winding 32c and a secondary winding 32d of horizontal output transformer 32, are rectified by diodes 53 and 54, respectively, for providing low B+ operating voltages of +27 volts and −30 volts at terminals 55 and 56, respectively, for various television receiver circuits, not shown. An end of each of the secondary windings 32c and 32d is coupled to a ground reference potential isolated from the AC line, such as the television receiver chassis. Diode 53 trace rectifies the voltage across winding 32c, and capacitors 57 and 58 and inductor 59 provide filtering for the +27V operating voltage. Diode 54 trace rectifies the voltage across winding 32d, and the anode of diode 54 is coupled to a capacitor 60 through a resistor 99 for providing the filtered −30V operating voltage. The +27 volts at terminal 55 is coupled to a +22 volt regulator 61, which may be of conventional design, for providing a +22V operating voltage at a terminal 62.

Low B+ operating voltages for the horizontal deflection circuit itself is also provided by horizontal output transformer 32. The +27 volts at the cathode of diode 53 is coupled to the collector of horizontal driver transistor 35 through a diode 63, filter elements 64–66, and the primary winding of coupling transformer 39. The +22 volts from terminal 62 is provided to horizontal oscillator 34 through a diode 67. Coupled to the cathode of diode 67 is a filter capacitor 68.

When first operating the television receiver, after closure of ON/OFF switch 70, horizontal deflection circuit 33 is inoperative, and no low B+ operating voltages are available for the deflection circuit itself. Another source of low B+ operating voltage for start-up of the horizontal deflection circuit must be provided.

An inductor 29b, magnetically coupled to inductor 29a, comprises a secondary winding of a transformer 29. One end of secondary winding 29b is coupled to a common junction point of the anodes of a diode 69 and a diode 71. The cathode of diode 69 is coupled to the cathode of diode 67, and the cathode of diode 71 is coupled to the cathode of diode 63. The other end of secondary winding 29b is coupled to the −30V terminal 56.

Main filter capacitor 28 is initially discharged. After closure of ON/OFF switch 70, during an initial interval, a large inrush current flows through rectifier 23 to charge up capacitor 28 to its steady state value. This inrush current also flows through primary winding 29a of transformer 29. An alternating current potential is developed across secondary winding 29b during this initial inrush interval. This alternating current potential is rectified by diodes 69 and 71 and provides a start-up low B+ operating voltage during the initial inrush interval of sufficient magnitude for use by horizontal oscillator 34 and horizontal driver transistor 35. Horizontal deflection circuit 33 begins to operate, and horizontal output transformer secondary winding 32c will provide the +27 volt low B+ operating voltage at the cathode of diode 53 after the initial inrush interval has elapsed.

During steady state operation, when main filter capacitor 28 has charged to its steady state DC voltage, diodes 69 and 71 become reverse-biased, and horizontal output transformer secondary winding 32c and its associated rectifiers and filters provide the steady state low B+ operating voltages for the horizontal deflection circuit.

A feature of the invention is to ensure that diodes 69 and 71 remain reversed-biased during the entirety of the steady state interval, thereby decoupling the alternating current potential appearing across secondary winding 29b of transformer 29 from the horizontal deflection circuit. This result is accomplished by coupling secondary winding 29b to the −30 volt terminal 56. Since the −30 volts is obtained from horizontal output transformer secondary winding 32d, the voltage at terminal 56 increases in magnitude from 0 volts at initial turn-on of the receiver to −30 volts during steady state operation, thereby ensuring reverse-biasing of diodes 69 and 71.

Figure 2:
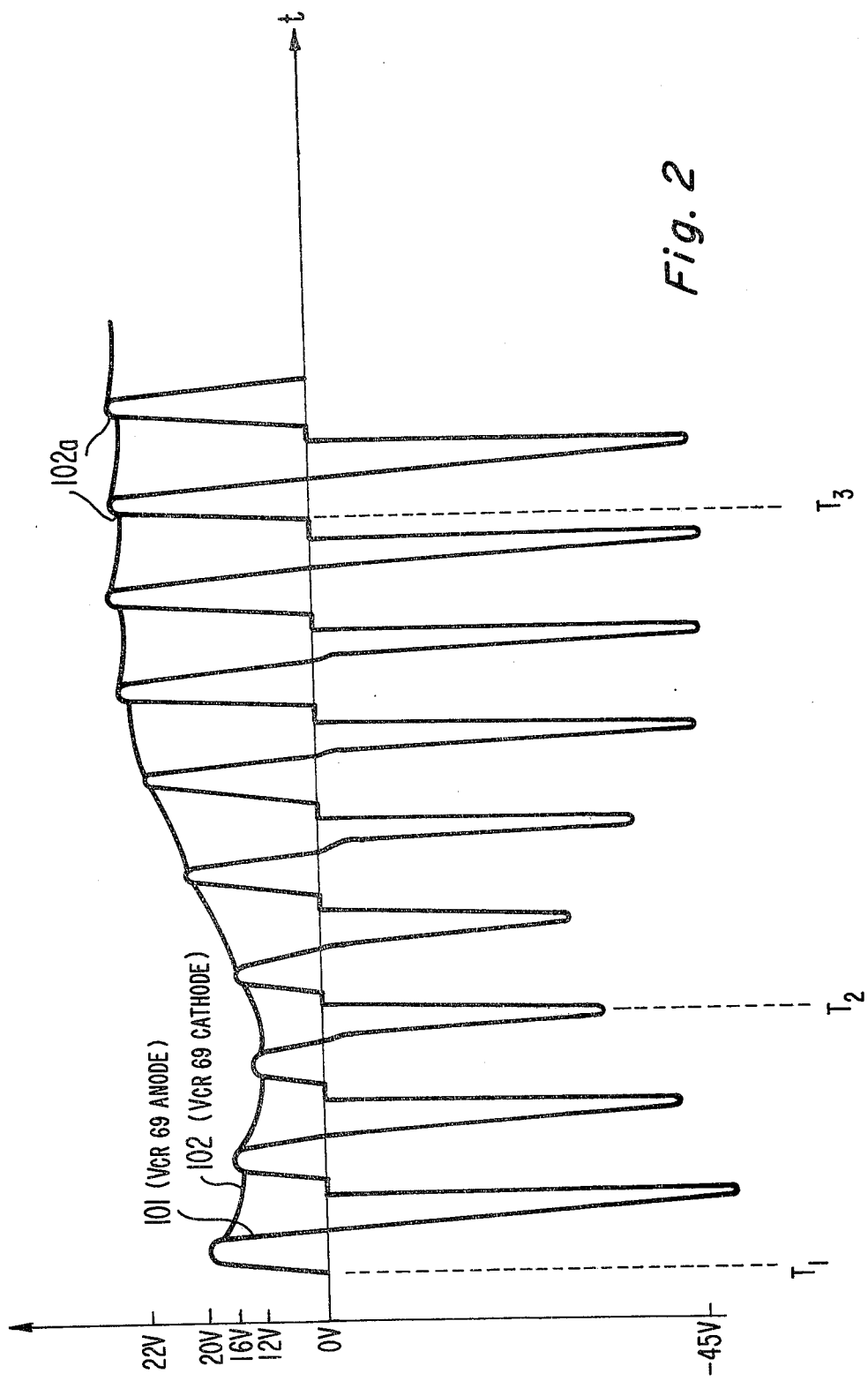
FIGS. 2 and 3 illustrate waveforms associated with the circuit of FIG. 1.

Consider, for example, coupling one end of winding 29b to a point of constant voltage such as the isolated ground, as shown by the dashed lines in FIG. 1, instead of coupling the end to the −30 volt terminal 56. Due to the inrush current flowing in primary winding 29a, an alternating current potential will be developed across secondary winding 29b, during an initial time interval $T_1$ to $T_3$, as indicated by voltage 101 of FIG. 2, representing the voltage at the anode of diode 69. Filter capacitors 64, 65 and 68 become charged by the positive pulses of voltage 101, as indicated by voltage 102, representing the voltage at the cathode of diode 69. After the first initial pulse, diodes 69 and 71 conduct only near the peak of the positive pulses of voltage 101.

As horizontal deflection circuit 33 begins to operate, its circuit elements, principally horizontal driver transistor 35, represent a load upon filter capacitors 64, 65, and 68 and upon transformer 29. Voltage 102 begins to decrease in average magnitude from time $T_1$ to $T_2$. After time $T_2$, horizontal deflection circuit 33 has been operating sufficiently long that the horizontal output transformer secondary winding 32c begins to charge filter capacitors 64 and 65 to +27 volts through diodes 53 and 63, and begins to charge filter capacitor 68 through the +22 volt regulator 61 and diode 67, as indicated by voltage 102 from times $T_2$ to $T_3$. Diodes 63 and 67 function to decouple the load circuits connected to the +27V and +22V terminals 55 and 62 from secondary winding 29b of transformer 29 during the initial interval.

After time $T_3$, during the steady state interval, significant alternating current potential still exists in secondary winding 29b due to the ripple current flowing through primary winding 29a that charges main filter capacitor 28 at a 120 Hz rate. The ripple current, therefore, also changes from maximum value to zero at a 120 Hz rate, producing a relatively large magnetic flux change and induced voltage in secondary winding 29b.

For some television receivers, for example, those with relatively low $\beta$ horizontal output transistors that require relatively large drive currents from the horizontal driver transistor, transformer 29 must provide a relatively large load power to the horizontal deflection circuit 33 during the initial inrush interval. Transformer 29 design factors, such as its turns ratio, and magnetic coupling must be such as to provide relatively large voltage pulses during times $T_1$ to $T_3$ in order that the load current, drawn by horizontal driver transistor 35, for example, will not cause voltage 102 to decrease below the minimum necessary to operate horizontal deflection circuit 33.

Satisfying the above criteria will also result in relatively large positive voltage pulses for voltage 101 during the steady state interval. In fact, the peak positive excursion of voltage 101 may exceed +22 volts, forward-biasing diode 69 near the peak voltage excursions and introducing a ripple voltage 102a into the +22 volts that supplies horizontal oscillator 34. Such ripple will be added to the desired +22 volts that regulator 61 would normally supply and produce unwanted distortion of the raster. Note, if the steady state output of transformer secondary winding 29b exceeds +27 volts peak, a similar ripple will appear across capacitors 64 and 65 as well.

Figure 3:
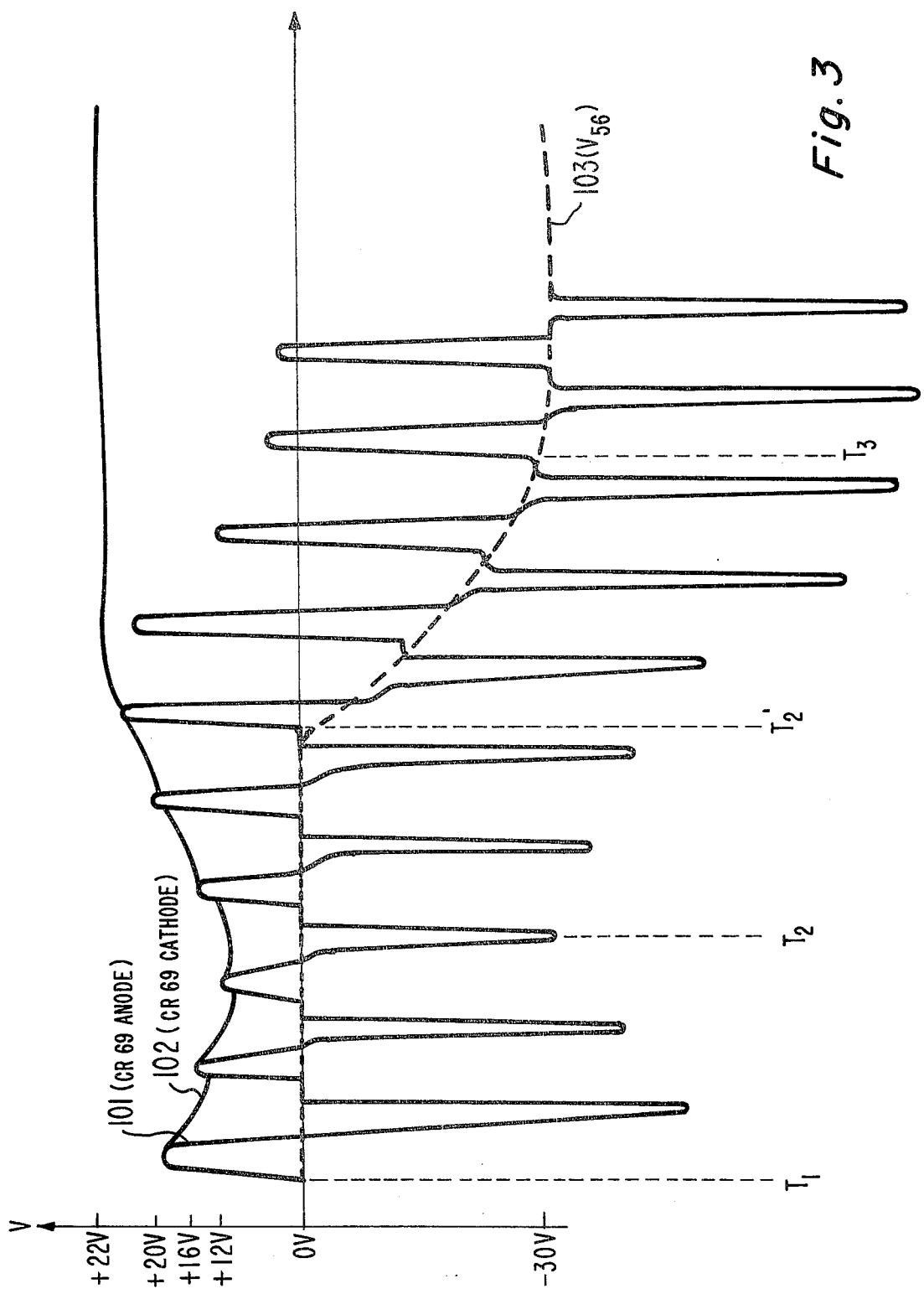

To eliminate the ripple caused by the steady state alternating current potential, winding 29b is coupled not to ground but to the −30 volt terminal 56, as illustrated in FIG. 1. The voltage at terminal 56 is zero for much of the initial inrush interval, as illustrated in FIG. 3 by voltage 103 from times $T_1$ to $T_2'$. After time $T_2'$, as horizontal deflection circuit 33 continues to operate, voltage 103 begins to decrease to −30 volts and will remain at −30 volts for the steady state interval after time $T_3$. The voltage at the anodes of diodes 69 and 71 is the superposition of the alternating current potential across winding 29b and the voltage at the −30 volt terminal 56. After time $T_3$, the peak positive excursion of voltage 101 is less than the +22 volts of voltage 102, as illustrated in FIG. 3, thereby reverse-biasing diodes 69 and 71 and decoupling the alternating current potential across winding 29b from the horizontal deflection circuit during the entirety of the steady state interval. The start-up power providing capability of transformer 29 is decreased very little by coupling secondary winding 29b to the −30 volt terminal 56, since initially the voltage at terminal 56 is zero, and the full peak positive excursions of the alternating current potential can be applied through diodes 69 and 71, undiminished by any negative DC voltage.

What is claimed is:

1. A start-up power supply, comprising:
   first rectifying means responsive to a source of first alternating current potential for providing a pulsating direct current voltage;
   filter means coupled to said first rectifying means for providing a first direct current voltage and in which an inrush current flows during an initial interval;
   a first inductor coupled to said filter means in which said inrush current flows;
   first means coupled to said first inductor and responsive to said inrush current for developing a second alternating current potential during said initial interval;
   a load circuit;
   second rectifying means coupled to said first means and responsive to said second alternating current potential for coupling a first operating voltage to said load circuit during said initial interval;
   second means coupled to said load circuit for providing a second operating voltage to said load circuit for replacing said first operating voltage during a steady state interval; and
   third means for coupling a third voltage to said second rectifying means, said third voltage varying in value from said initial interval to said steady state interval in a manner providing for decoupling of said second alternating current potential from said load circuit during the entirety of said steady state interval.

2. A power supply according to claim 1, wherein said third means comprises a first secondary winding of a horizontal output transformer.

3. A power supply according to claim 2, wherein said second means comprises a second secondary winding of said horizontal output transformer.

4. A power supply according to claim 3, wherein said load circuit comprises a horizontal deflection circuit.

5. A power supply according to claim 4, wherein said first operating voltage is coupled to a horizontal driver transistor of said horizontal deflection circuit.

6. A power supply according to claim 4, wherein said first means comprises a second inductor magnetically coupled to said first inductor.

7. A start-up circuit, comprising:
   first rectifying means responsive to a source of first alternating current potential for providing a pulsating direct current voltage;
   filter means coupled to said first rectifying means for providing a first direct current voltage and in which an inrush current flows during an initial interval;
   a start-up transformer including a primary winding coupled to said first rectifying means and a secondary winding in which a second alternating current potential is developed during said initial interval;
   a deflection circuit;
   second rectifying means coupled to said start-up transformer and responsive to said second alternating current potential for coupling a first operating voltage to said deflection circuit during said initial interval;
   first means coupled to said deflection circuit for providing a second operating voltage to said deflection circuit for replacing said first operating voltage during a steady state interval; and
   second means for coupling a third voltage to said second rectifying means, said third voltage varying in value from said initial interval to said steady state interval in a manner which maintains said second rectifying means nonconducting during the entirety of said steady state interval.

8. A start-up circuit according to claim 7, wherein said second means comprises a first secondary winding of a deflection output transformer.

9. A start-up circuit according to claim 8, wherein said first means comprises a second secondary winding of a deflection output transformer.

10. A start-up power supply comprising:
    a first winding in which a first alternating current voltage is developed during a start-up interval;
    first rectifying means coupled to said first winding for rectifying said first alternating current voltage;
    filter means coupled to said first rectifying means for providing a first direct current operating voltage of a first polarity during said start-up interval, an alternating current ripple voltage being superimposed upon said first direct current voltage of a first polarity;
    a source of second direct current operating voltage of said first polarity coupled to said first filter means for replacing said first direct current operating voltage during a steady state interval, said second direct current operating voltage reverse biasing said first rectifying means; and
    a source of third direct current voltage coupled to said first winding of a polarity opposite said first polarity, the magnitude of said third direct current voltage changing from a start-up value to a steady state value in a manner which will prevent said alternating current ripple voltage from forward biasing said first rectifying means during any portion of said steady state interval.

* * * * *

UNITED STATES PATENT AND TRADEMARK OFFICE
CERTIFICATE OF CORRECTION

PATENT NO. : 4,112,465

DATED : September 5, 1978

INVENTOR(S) : Donald Henry Willis

It is certified that error appears in the above-identified patent and that said Letters Patent is hereby corrected as shown below:

Title, that portion reading "Thrush" should read -- Inrush --.

Signed and Sealed this

Sixth Day of March 1979

[SEAL]

Attest:

RUTH C. MASON
*Attesting Officer*

DONALD W. BANNER
*Commissioner of Patents and Trademarks*